(12) United States Patent
Clawson (10) Patent No.: US 8,670,526 B2
(45) Date of Patent: *Mar. 11, 2014

(54) HATE CRIME DIAGNOSTIC AND INTERVENTION TOOL FOR EMERGENCY DISPATCH

(76) Inventor: Jeffrey J. Clawson, Salt Lake City, UT (US)

( * ) Notice: Subject to any disclaimer, the term of this patent is extended or adjusted under 35 U.S.C. 154(b) by 525 days.

This patent is subject to a terminal disclaimer.

(21) Appl. No.: 13/026,043

(22) Filed: Feb. 11, 2011

(65) Prior Publication Data

US 2012/0210271 A1   Aug. 16, 2012

(51) Int. Cl.
*H04M 11/00* (2006.01)

(52) U.S. Cl.
USPC ............ 379/45; 379/42; 379/37; 379/201.01; 379/201.03

(58) Field of Classification Search
USPC ................. 379/45, 42, 37, 201.01, 201.03
See application file for complete search history.

(56) References Cited

U.S. PATENT DOCUMENTS

| | | | |
|---|---|---|---|
| 3,799,147 A | 3/1974 | Adolph et al. | |
| 4,130,881 A | 12/1978 | Haessler et al. | |
| 4,164,320 A | 8/1979 | Irazoqui et al. | |
| 4,237,344 A | 12/1980 | Moore | |
| 4,290,114 A | 9/1981 | Sinay | |
| 4,338,493 A | 7/1982 | Stenhuis et al. | |
| 4,360,345 A | 11/1982 | Hon | |
| 4,455,548 A | 6/1984 | Burnett | |
| 4,489,387 A | 12/1984 | Lamb et al. | |
| 4,731,725 A | 3/1988 | Suto et al. | |
| 4,839,822 A | 6/1989 | Dormond et al. | |
| 4,858,121 A | 8/1989 | Barber et al. | |
| 4,865,549 A | 9/1989 | Sonsteby | |

(Continued)

FOREIGN PATENT DOCUMENTS

| | | |
|---|---|---|
| GB | 2471960 | 1/2011 |
| JP | 2002-049693 | 2/2002 |

(Continued)

OTHER PUBLICATIONS

International Search Report and Written Opinion PCT/US2010/050402, filed on Sep. 27, 2010, and mailed from ISA on Apr. 27, 2011, 9 pgs.

(Continued)

*Primary Examiner* — Joseph J Nguyen
(74) *Attorney, Agent, or Firm* — John R. Thompson; Stoel Rives, LLP (57) ABSTRACT

Systems and methods are provided to assist an emergency dispatcher in responding to emergency calls reporting incidents involving a hate crime or other anti-social behavior toward a victim. The systems and methods can include an emergency police dispatch protocol configured to facilitate uniform and consistent gathering of information about an incident being reported and configured to determine a determinant value corresponding to an appropriate emergency dispatch response. A diagnostic tool is provided to aid the dispatcher in gathering information about the victim that pertains to one or more bias categories. The victim information can be used to identify one or more potential biases that could have motivated the perpetrator of the hate crime or other anti-social behavior. The diagnostic tool facilitates uniform and consistent gathering of victim information pertaining to various bias types. The information may be stored and/or processed for use in monitoring and/or tracking hate crimes and other anti-social behavior. The diagnostic tool can be launched automatically by the emergency dispatch protocol, or manually by a dispatcher. The diagnostic tool presents a user interface that provides, among other things, instructions, symptoms, and input fields.

22 Claims, 5 Drawing Sheets

(56) References Cited

U.S. PATENT DOCUMENTS

| | | |
|---|---|---|
| 4,922,514 A | 5/1990 | Bergeron et al. |
| 4,926,495 A | 5/1990 | Comroe et al. |
| 4,945,476 A | 7/1990 | Bodick et al. |
| 4,967,754 A | 11/1990 | Rossi |
| 5,063,522 A | 11/1991 | Winters |
| 5,065,315 A | 11/1991 | Garcia |
| 5,072,383 A | 12/1991 | Brimm et al. |
| 5,077,666 A | 12/1991 | Brimm et al. |
| 5,086,391 A | 2/1992 | Chambers |
| 5,109,399 A | 4/1992 | Thompson |
| 5,122,959 A | 6/1992 | Nathanson et al. |
| 5,193,855 A | 3/1993 | Shamos |
| 5,228,449 A | 7/1993 | Christ et al. |
| 5,253,164 A | 10/1993 | Holloway et al. |
| 5,255,187 A | 10/1993 | Sorensen |
| 5,291,399 A | 3/1994 | Chaco |
| 5,323,444 A | 6/1994 | Ertz et al. |
| 5,339,351 A | 8/1994 | Hoskinson et al. |
| 5,348,008 A | 9/1994 | Bornn et al. |
| 5,379,337 A | 1/1995 | Castillo et al. |
| 5,404,292 A | 4/1995 | Hendrickson |
| 5,410,471 A | 4/1995 | Alyfuku et al. |
| 5,423,061 A | 6/1995 | Fumarolo et al. |
| 5,438,996 A | 8/1995 | Kemper et al. |
| 5,441,047 A | 8/1995 | David et al. |
| 5,462,051 A | 10/1995 | Oka et al. |
| 5,471,382 A | 11/1995 | Tallman et al. |
| 5,502,726 A | 3/1996 | Fischer |
| 5,513,993 A | 5/1996 | Lindley et al. |
| 5,516,702 A | 5/1996 | Senyei et al. |
| 5,521,812 A | 5/1996 | Feder et al. |
| 5,536,084 A | 7/1996 | Curtis et al. |
| 5,544,649 A | 8/1996 | David et al. |
| 5,554,031 A | 9/1996 | Moir et al. |
| 5,590,269 A | 12/1996 | Kruse et al. |
| 5,594,638 A | 1/1997 | Iliff |
| 5,594,786 A | 1/1997 | Chaco et al. |
| 5,596,994 A | 1/1997 | Bro |
| 5,630,125 A | 5/1997 | Zellweger |
| 5,636,873 A | 6/1997 | Sonsteby |
| 5,650,995 A | 7/1997 | Kent |
| 5,660,176 A | 8/1997 | Iliff |
| 5,675,372 A | 10/1997 | Aguayo, Jr. et al. |
| 5,682,419 A | 10/1997 | Grube et al. |
| 5,684,860 A | 11/1997 | Milani et al. |
| 5,689,229 A | 11/1997 | Chaco et al. |
| 5,719,918 A | 2/1998 | Serbetciouglu et al. |
| 5,722,418 A | 3/1998 | Bro |
| 5,724,983 A | 3/1998 | Selker et al. |
| 5,734,706 A | 3/1998 | Windsor et al. |
| 5,745,532 A | 4/1998 | Campana, Jr. |
| 5,748,907 A | 5/1998 | Crane |
| 5,754,960 A | 5/1998 | Downs et al. |
| 5,759,044 A | 6/1998 | Redmond |
| 5,761,278 A | 6/1998 | Pickett et al. |
| 5,761,493 A | 6/1998 | Blakeley et al. |
| 5,787,429 A | 7/1998 | Nikolin, Jr. |
| 5,805,670 A | 9/1998 | Pons et al. |
| 5,809,493 A | 9/1998 | Ahamed et al. |
| 5,822,544 A | 10/1998 | Chaco et al. |
| 5,823,948 A | 10/1998 | Ross, Jr. et al. |
| 5,826,077 A | 10/1998 | Blakeley et al. |
| 5,832,187 A | 11/1998 | Pedersen et al. |
| 5,842,173 A | 11/1998 | Strum et al. |
| 5,844,817 A | 12/1998 | Lobley et al. |
| 5,850,611 A | 12/1998 | Krebs |
| 5,857,966 A | 1/1999 | Clawson |
| 5,901,214 A | 5/1999 | Shaffer et al. |
| 5,902,234 A | 5/1999 | Webb |
| 5,910,987 A | 6/1999 | Ginter et al. |
| 5,912,818 A | 6/1999 | McGrady et al. |
| 5,915,019 A | 6/1999 | Ginter et al. |
| 5,926,526 A | 7/1999 | Rapaport et al. |
| 5,933,780 A | 8/1999 | Connor et al. |
| 5,961,446 A | 10/1999 | Beller et al. |
| 5,962,891 A | 10/1999 | Arai |
| 5,964,700 A | 10/1999 | Tallman et al. |
| 5,986,543 A | 11/1999 | Johnson |
| 5,989,187 A | 11/1999 | Clawson |
| 5,991,730 A | 11/1999 | Lubin et al. |
| 5,991,751 A | 11/1999 | Rivette et al. |
| 6,004,266 A | 12/1999 | Clawson |
| 6,010,451 A | 1/2000 | Clawson |
| 6,022,315 A | 2/2000 | Iliff |
| 6,035,187 A | 3/2000 | Franza |
| 6,040,770 A | 3/2000 | Britton |
| 6,052,574 A | 4/2000 | Smith, Jr. |
| 6,053,864 A | 4/2000 | Clawson |
| 6,058,179 A | 5/2000 | Shaffer et al. |
| 6,074,345 A | 6/2000 | van Oostrom et al. |
| 6,076,065 A | 6/2000 | Clawson |
| 6,078,894 A | 6/2000 | Clawson et al. |
| 6,106,459 A | 8/2000 | Clawson |
| 6,112,083 A | 8/2000 | Sweet et al. |
| 6,115,646 A | 9/2000 | Fiszman et al. |
| 6,117,073 A | 9/2000 | Jones et al. |
| 6,118,866 A | 9/2000 | Shtivelman |
| 6,127,975 A | 10/2000 | Maloney |
| 6,134,105 A | 10/2000 | Lueker |
| 6,292,542 B1 | 9/2001 | Bilder |
| 6,370,234 B1 | 4/2002 | Kroll |
| 6,535,121 B2 | 3/2003 | Matheny |
| 6,594,634 B1 | 7/2003 | Hampton et al. |
| 6,607,481 B1 | 8/2003 | Clawson |
| 6,610,012 B2 | 8/2003 | Mault |
| 6,696,956 B1 | 2/2004 | Uchida et al. |
| 6,879,819 B2 | 4/2005 | Brooks |
| 6,901,397 B1 | 5/2005 | Moldenhauer et al. |
| 6,931,112 B1 | 8/2005 | McFarland et al. |
| 6,968,375 B1 | 11/2005 | Brown |
| 7,106,835 B2 | 9/2006 | Saalsaa |
| 7,194,395 B2 | 3/2007 | Genovese |
| 7,289,944 B1 | 10/2007 | Genovese |
| 7,428,301 B1 | 9/2008 | Clawson |
| 7,436,937 B2 | 10/2008 | Clawson |
| 7,645,234 B2 | 1/2010 | Clawson |
| 7,703,020 B2 | 4/2010 | Bhattaru |
| 7,783,586 B2 | 8/2010 | Friedlander et al. |
| 7,978,826 B2 | 7/2011 | Salafia et al. |
| 8,294,570 B2 | 10/2012 | Clawson |
| 8,335,298 B2 | 12/2012 | Clawson |
| 2002/0004729 A1 | 1/2002 | Zak et al. |
| 2002/0106059 A1 | 8/2002 | Kroll et al. |
| 2003/0028536 A1 | 2/2003 | Singh et al. |
| 2003/0050538 A1 | 3/2003 | Naghavi et al. |
| 2003/0187615 A1 | 10/2003 | Epler et al. |
| 2003/0195394 A1 | 10/2003 | Saalsaa |
| 2003/0212575 A1 | 11/2003 | Saalsaa et al. |
| 2005/0015115 A1 | 1/2005 | Sullivan et al. |
| 2006/0059423 A1 | 3/2006 | Lehmann et al. |
| 2006/0122520 A1 | 6/2006 | Banet et al. |
| 2006/0167346 A1 | 7/2006 | Sarel |
| 2006/0173500 A1 | 8/2006 | Walker et al. |
| 2006/0178908 A1 | 8/2006 | Rappaport |
| 2006/0212315 A1 | 9/2006 | Wiggins |
| 2006/0225213 A1 | 10/2006 | Tomcany |
| 2007/0055559 A1 | 3/2007 | Clawson |
| 2007/0112275 A1 | 5/2007 | Cooke et al. |
| 2007/0116189 A1 | 5/2007 | Clawson |
| 2007/0201664 A1 | 8/2007 | Salafia et al. |
| 2008/0310600 A1 | 12/2008 | Clawson |
| 2009/0168975 A1 | 7/2009 | Clawson |
| 2009/0191529 A1 | 7/2009 | Mozingo et al. |
| 2010/0004710 A1 | 1/2010 | Kellum |
| 2010/0121156 A1 | 5/2010 | Yoo |
| 2010/0152800 A1 | 6/2010 | Walker et al. |
| 2010/0198755 A1 | 8/2010 | Soll et al. |
| 2010/0257250 A1 | 10/2010 | Salafia et al. |
| 2011/0064204 A1 | 3/2011 | Clawson |
| 2011/0066002 A1 | 3/2011 | Clawson |
| 2011/0099031 A1 | 4/2011 | Nair |
| 2011/0205052 A1 | 8/2011 | Clawson |

(56) References Cited

U.S. PATENT DOCUMENTS

| | | | |
|---|---|---|---|
| 2011/0215930 | A1 | 9/2011 | Lee et al. |
| 2012/0183128 | A1 | 7/2012 | Clawson |
| 2012/0207286 | A1 | 8/2012 | Clawson |

FOREIGN PATENT DOCUMENTS

| | | | |
|---|---|---|---|
| JP | 2003109162 A | 4/2003 | |
| JP | 2003-187003 A | 7/2003 | |
| JP | 2003256963 A | 9/2003 | |
| JP | 2010033201 A | 12/2010 | |
| KR | 10-2005-0085778 A | 8/2005 | |
| KR | 10-2006-0084866 A | 7/2006 | |
| KR | 20070043337 A | 4/2007 | |
| KR | 10-2008-0004125 A | 1/2008 | |
| WO | WO 2004030259 | 4/2004 | |
| WO | WO2006/015229 A2 | 2/2006 | |
| WO | WO2008/156876 A1 | 12/2008 | |
| WO | WO 2011031383 | 3/2011 | |

OTHER PUBLICATIONS

International Preliminary Report of Patentability for PCT/US2009/048577 filed on Jun. 25, 2009 mailed Oct. 27, 2011, 7 pgs.
International Search Report and Written Opinion for PCT/US2011/042543 filed on Jun. 30, 2011, and mailed from ISA on Feb. 9, 2012, 11 pgs.
International Search Report and Written Opinion for PCT/US2011/042582 filed on Jun. 30, 2011, and mailed from ISA on Feb. 9, 2012, 8 pgs.
International Preliminary Report of Patentability for PCT/US2010/043308 filed on Jul. 27, 2010 mailed Mar. 22, 2012, 6 pgs.
International Preliminary Report of Patentability for PCT/US2010/043311 filed on Jul. 27, 2010 mailed Mar. 29, 2012, 6 pgs.
Office Action Summary from USPTO for U.S. Appl. No. 12/558,045 mailed Mar. 22, 2012, 9 pgs.
United States Patent Office, Office Action for U.S. Appl. No. 12/558,808, mailed Apr. 23, 2011.
Office Action for U.S. Appl. No. 12/268,963, filed Nov. 11, 2008, mailed from USPTO on Jul. 29, 2011, 18 pgs.
International Search Report and Written Opinion for PCT/US2012/021867 filed Jan. 19, 2012, and mailed Aug. 30, 2012, 9 pgs.
Office Action for U.S. Appl. No. 12/396,201, filed Mar. 2, 2009 and mailed from USPTO on Mar. 8, 2011, 23 pgs.
Radosevich, Lynda, "Network holds sway on life, death," Computerworld, v27 n21, May 24, 1993, 2 pgs.
Harris, Roger, "Updated 911 Phone System Top Concern of Residents," Business First-Louisville, v9 n19 s1, Dec. 1992, 3 pgs.
"Geac Completes Software Install," Wireless Week, Nov. 18, 1996, 3 pgs.
"Dictaphone introduces Windows-based Computer-Aided Dispatch (CAD) system," Business Wire, Apr. 23, 1996, 2 pgs. (in commercial use in 1995).
Holroyd, Brian, et al., "Medical Control; Quality Assurance in Prehospital Care," JAMA, the Journal of American Medical Association, v256, n8, Aug. 1986, p. 1027-1031.
CBS web page News Story entitled "911 Operator: 'It's got to be Hell'", Mar. 31, 2006 (excerpts from 911 operators' actions during the attacks on Sep. 11, 2001), 3 pgs.
Best, Wendy, "999 United Emergency services share life-saving Role to boost response," Western Daily Press, WDP Severnside ed., May 27, 1999, 2 pgs.
Poellmitz, William C., "Wireless technology keeps public safety a step ahead," Nation's Cities Weekly, v21 n17, Apr. 27, 1998, 3 pgs.
Crowley, Mark, "Learning from CAD System Implementation," Communications, v29 n8, Aug. 1992, 5 pgs.
Anonymous, "Suburban Chicago towns centralize 911 services," Communications News, v31 n10, Oct. 1994, 2 pgs.
Office Action Summary from USPTO for U.S. Appl. No. 10/255,901 mailed Dec. 31, 2003, 8 pgs.
Office Action Summary from USPTO for U.S. Appl. No. 10/255,901 mailed Oct. 13, 2004, 8 pgs.
Office Action Summary from USPTO for U.S. Appl. No. 10/255,901 mailed Jun. 29, 2005, 7 pgs.
Advisory Action Before the Filing of an Appeal Brief from USPTO for U.S. Appl. No. 10/255,901 mailed Feb. 14, 2006, 3 pgs.
Office Action Summary from USPTO for U.S. Appl. No. 10/255,901 mailed Jun. 7, 2006, 8 pgs.
Office Action Summary from USPTO for U.S. Appl. No. 10/255,901 mailed Feb. 27, 2007, 8 pgs.
Office Action Summary from USPTO for U.S. Appl. No. 10/255,901 mailed Sep. 6, 2007, 9 pgs.
Office Action Summary from USPTO for U.S. Appl. No. 10/255,905 mailed May 19, 2004, 7 pgs.
Office Action Summary from USPTO for U.S. Appl. No. 10/255,905 mailed May 26, 2005, 5 pgs.
Office Action Summary from USPTO for U.S. Appl. No. 10/255,905 mailed Feb. 9, 2006, 8 pgs.
Advisory Action Before the Filing of an Appeal Brief from USPTO for U.S. Appl. No. 10/255,905 mailed Aug. 11, 2006, 3 pgs.
Office Action Summary from USPTO for U.S. Appl. No. 10/255,905 mailed Jan. 30, 2007, 7 pgs.
Notice of Non-Compliant Amendment (37 CFR 1.121) from USPTO for U.S. Appl. No. 10/255,905 mailed Jul. 9, 2007, 4 pgs.
Office Action Summary from USPTO for U.S. Appl. No. 10/255,905 mailed Oct. 5, 2007, 7 pgs.
Office Action Summary from USPTO for U.S. Appl. No. 09/685,697 mailed Jul. 18, 2003, 8 pgs.
Office Action Summary from USPTO for U.S. Appl. No. 09/685,697 mailed Feb. 3, 2004, 5 pgs.
Office Action Summary from USPTO for U.S. Appl. No. 09/685,697 mailed Jan. 4, 2005, 5 pgs.
Office Action Summary from USPTO for U.S. Appl. No. 09/685,697 mailed Oct. 4, 2005, 7 pgs.
Advisory Action Before the Filing of an Appeal Brief from USPTO for U.S. Appl. No. 09/685,697 mailed Mar. 13, 2006, 4 pgs.
Office Action Summary from USPTO for U.S. Appl. No. 09/685,697 mailed Jun. 26, 2006, 8 pgs.
Office Action Summary from USPTO for U.S. Appl. No. 09/685,697 mailed Apr. 10, 2007, 9 pgs.
Office Action Summary from USPTO for U.S. Appl. No. 09/685,697 mailed Oct. 9, 2007, 11 pgs.
Office Action Summary from USPTO for U.S. Appl. No. 10/140,635 mailed Oct. 3, 2003, 9 pgs.
Office Action Summary from USPTO for U.S. Appl. No. 10/140,635 mailed Jul. 16, 2004, 11 pgs.
Office Action Summary from USPTO for U.S. Appl. No. 10/140,635 mailed Apr. 19, 2005, 11 pgs.
Office Action Summary from USPTO for U.S. Appl. No. 10/140,635 mailed Jan. 17, 2006, 13 pgs.
Office Action Summary from USPTO for U.S. Appl. No. 10/140,635 mailed Sep. 20, 2006, 15 pgs.
Office Action Summary from USPTO for U.S. Appl. No. 10/140,635 mailed Jun. 21, 2007, 15 pgs.
International Search Report for PCT/US2008/054987 filed on Feb. 26, 2008, and mailed on Oct. 8, 2008, 2 pgs.
Written Opinion of the International Searching Authority for PCT/US2008/054987 filed on Feb. 26, 2008, and mailed on Oct. 8, 2008, 9 pgs.
Notification of Transmittal of the International Search Report (2 pgs.) for PCT/US2009/040909, International Search Report, (2 pgs.), and Written Opinion (8 pgs.) mailed from International Searching Authority on Jun. 10, 2009.
International Search Report and Written Opinion for PCT/US09/48577, International filing date Jun. 25, 2009, mailed from ISA Aug. 7, 2009, 9 pgs.
International Search Report and Written Opinion mailed Jan. 19, 2011 in PCT Application No. PCT/US2010/043308, filed Jul. 27, 2010.
International Search Report and Written Opinion mailed Jan. 19, 2011 in PCT Application No. CT/US2010/043311, filed Jul. 27, 2010.

(56) References Cited

OTHER PUBLICATIONS

Office Action Summary from USPTO for U.S. Appl. No. 12/422,561 mailed Feb. 1, 2013, 26 pgs.
Notice of Allowance from USPTO for U.S. Appl. No. 13/026,055 mailed Jan. 24, 2013.
Office Action Summary from USPTO for U.S. Appl. No. 13/354,116 mailed Jan. 22, 2013, 9 pgs.
Notice of Allowance from USPTO for U.S. Appl. No. 10/255,901 mailed Feb. 20, 2013.
Nordberg, Marie, "Dispatch Disasters," Emergency Medicine, Aug. 1995.
Office Action Summary from USPTO for U.S. Appl. No. 12/422,561 mailed Jul. 3, 2012, 23 pgs.
Liferidge, Aisha T., et al., "Ability of Laypersons to Use the Cincinnati Prehospital Stroke Scale", Prehospital Emergency Care, Elsevier, vol. 8, No. 4, Oct. 1, 2004, pp. 384-387.
International Preliminary Report of Patentability for PCT/US2011/042543 filed on Jun. 30, 2011 mailed Aug. 22, 2013, 7 pgs.
International Preliminary Report of Patentability for PCT/US2011/042582 filed on Jun. 30, 2011 mailed Aug. 22, 2013, 5 pgs.
Office Action Summary from USPTO for U.S. Appl. No. 13/605,501 mailed Nov. 18, 2013.
International Search Report and Written Opinion for PCT/US2013/055537 filed on Aug. 19, 2013 and mailed from ISA on Nov. 22, 2013.
Nor, A. Mohd, et al., "Agreement Between Ambulance Paramedic- and Physician-Recorded Neurological Signs With Face Arm Speech Test (FAST) in Acute Stroke Patients", http://stroke.ahajournals.org/content/35/6/1355, Apr. 29, 2004, visited Nov. 17, 2013, 3 pgs.

HATE CRIME DIAGNOSTIC AND INTERVENTION TOOL FOR EMERGENCY DISPATCH

COPYRIGHT NOTICE

©2011 Priority Dispatch Corp. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to computer systems and methods for providing emergency protocol interrogation, instruction, and dispatch. More specifically, the invention is directed to computer-implemented tools to assist a dispatcher during interrogation and instruction of an emergency caller.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Criminal acts intended to hurt and intimidate a victim because of their race, ethnicity, national origin, religious views, sexual orientation, or disability are commonly referred to as "hate crimes," "bias crimes," or "bias-motivated crimes." Closely related are other bias-motivated anti-social acts and behavior that, while not criminal, is targeted at a victim based on a bias of the perpetrator against the victim. The perpetrators are known to use explosives, arson, weapons, vandalism, physical violence, and verbal threats of violence to instill fear in their victims. The victims are left vulnerable to more attacks and left feeling alienated, helpless, suspicious, and fearful.

Concern about hate crimes and other bias-motivated anti-social behavior has risen among policymakers in many nations and at all levels of government. The concern about hate crimes and bias-motivated anti-social behavior has become more prevalent in recent years because of greater recognition of the far-reaching effects, beyond the direct impact to the victims. Hate crimes and other bias-motivated anti-social behavior can exacerbate tensions, which can trigger larger community-wide conflict, civil disturbances, and even riots. The community at large may become frustrated and angry if they believe the local government and law enforcement agencies will not protect them. When perpetrators of hate are not prosecuted as criminals and their acts not publicly condemned, their crimes can weaken even those communities or societies with the healthiest pluralism, or tolerance for numerous distinct ethnic, religious, cultural, and other groups.

A core responsibility of government, and specifically law enforcement agencies, is to protect the civil rights of its citizens and to ensure civil relations between various majority and/or minority groups. Identifying and monitoring hate crime activity can be an important component to government fulfilling these responsibilities. However, identifying and gathering statistics on hate crimes and other bias-motivated anti-social behavior, to monitor trends and otherwise track social group tensions in a community, has proven challenging. Identifying and tracking bias-motivated anti-social behavior trends are difficult. Interpretations about bias-motivated anti-social behavior vary and identifying a hate crime and other bias-motivated anti-social behavior can be inherently subjective.

Often hate crimes and other anti-social behavior goes unreported. Victims sometimes are simply oblivious to any potential bias-motivation of the perpetrator. Even when victims suspect a bias-motivation, law enforcement personnel and agencies presently lack an objective standard by which to evaluate whether a particular crime or other incident is bias-motivated. What one agency may designate a hate crime, another agency would not. Similarly, the factors considered by different agencies for different cases may be inconsistent and sporadic. The factors that one law enforcement officer may consider in determining whether a hate crime has occurred, another law enforcement officer may not think to consider such factors. Thus, the information or data that results from collecting the reported information tends to be disorderly, unmanageable, and nearly unusable. (In the description that follows, the terms "information" and "data" may be used interchangeably, and are not to be construed as limiting in any way. However, as clarification, the term "data" as used herein may primarily refer to information after it is collected, which may be combined with data for other cases and used to monitor and track a hate crimes and other bias-motivated anti-social behavior. The terms "gather" and "collect" may also be used interchangeably herein, and are not to be construed as limiting in any way. However, the term "collect" may primarily contemplate compiling and/or formatting information into data.)

In short, law enforcement personnel and agencies simply lack a process or mechanism by which to compile meaningful, useful data that may be reported and that can be used to develop a standard against which to measure and that can be used to track trends. Furthermore, law enforcement personnel and agencies lack any ability to share or otherwise combine data of a plurality of agencies to further enhance the available data from which to develop a standard, identify and track trends, generate statistics, and the like.

Emergency dispatchers are often an early interface to law enforcement. In their role of receiving emergency calls, a dispatcher is in a unique position to potentially be the first to identify and/or report a hate crime. Also, emergency dispatch services can be uniquely positioned to gather uniform statistical information concerning hate crimes and other bias-motivated anti-social behavior, potentially from a plurality of law enforcement agencies. In particular, emergency dispatchers process emergency calls relating to a wide variety of emergency situations, including emergencies involving hate crimes and other anti-social behavior. Dispatchers often play a role in dispatching emergency responders, including law enforcement officers, to the scene of an incident. The dispatchers in effect send the law enforcement personnel and/or agencies, coordinating the first interaction between a patient and a law enforcement officer. As an early interface, emergency dispatchers are well positioned to play a role in gathering information to gather data that can be used to track and monitor trends of hate crimes and other anti-social behavior.

Unfortunately, often emergency dispatchers are inexperienced and unskilled, largely due to a high turnover rate among emergency dispatchers. Moreover, dispatchers presently lack any mechanism or tool to compile data relating to hate crimes and other anti-social behavior.

An automated emergency dispatch system, potentially implemented on a computer, can aid even an unskilled and inexperienced dispatcher in prioritizing emergency calls that are received and in processing the calls to generate an appropriate emergency dispatch response. Regardless of the experience or skill level of the dispatcher, the automated emergency dispatch systems can enable a consistent and predictable emergency dispatch response, despite the diverse aspects of emergency situations that may be reported from one call to the next.

Although an automated emergency dispatch system can enable receiving and processing of widely divergent aspects of emergency situations, these systems may not be well suited for processing particular types of unique situations. More particularly, an automated emergency dispatch system may not be well suited to gather and/or assess factors that may be indicative of a hate crime and other bias-motivated anti-social behavior. An emergency situation involving bias motivations may require considering factors external to the incident being reported. Proper processing of calls reporting crimes and other incidents involving bias motivations may require probing and in-depth exploration of the factors at the time that the situation is reported. The further exploration may require the dispatcher to probe more deeply to gather more descriptive details of the potential biases that may be present and/or that may have influenced the perpetrator(s). As such, emergency situations involving a hate crime and other bias-motivated anti-social behavior may benefit from particular and more detailed instructions. Additional interrogation, instructions, and/or alternative emergency dispatch procedures or protocols may facilitate gathering information that can be used in identifying a hate crime and other bias-motivated anti-social behavior and in monitoring trends.

Existing automated emergency dispatch systems are not equipped to assist or enable a dispatcher to process an emergency call involving bias-motivated action. At present, automated emergency dispatch systems are better configured for handling a broad spectrum of emergencies, rather than for exploring specific types of situations in greater depth to gather useful, probative information. In particular, exploring a situation to gather more detailed information may be difficult and cumbersome within the protocol of the emergency dispatch system.

A dispatcher with little or no sociological training or experience likely cannot compensate for the shortcomings of an automated emergency dispatch system. Inexperienced and/or unskilled dispatchers are generally unable to properly explore situations such as hate crimes and other bias-motivated anti-social behavior, nor guide a caller to do so. Even highly skilled and experienced dispatchers may have little skill or experience with handling incidents involving bias-motivated anti-social behavior, simply because bias-motivated anti-social behavior may be relatively rare compared to other types of incidents that are reported. Accordingly, the present disclosure provides a diagnostic tool to supplement an automated emergency dispatch system and enable consistent and uniform gathering of information.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Some aspects of the embodiments described will be illustrated as software modules or components. As used herein, a software module or component may include any type of computer instruction or computer executable code located within a memory device and/or a non-transitory computer-readable storage medium. A software module may, for instance, comprise one or more physical or logical blocks of computer instructions, which may be organized as a routine, program, object, component, data structure, etc. that performs one or more tasks or implements particular abstract data types.

In certain embodiments, a particular software module may comprise disparate instructions stored in different locations of a memory storage device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

An emergency dispatch system and/or diagnostic tool as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, UNIX, AIX, CLIX, QNX, OS/2, and Apple. Alternatively, it is expected that future embodiments will be adapted to execute on other future operating systems. The memory may also store application programs including a Computer Aided Dispatch (CAD) program, an automated emergency dispatch protocol, and a user interface program. The memory may also include data storage. The computer may further include an output device, such as a display unit, for viewing the displayed instructions and inquiries and a user input device for inputting response data.

Figure 1:
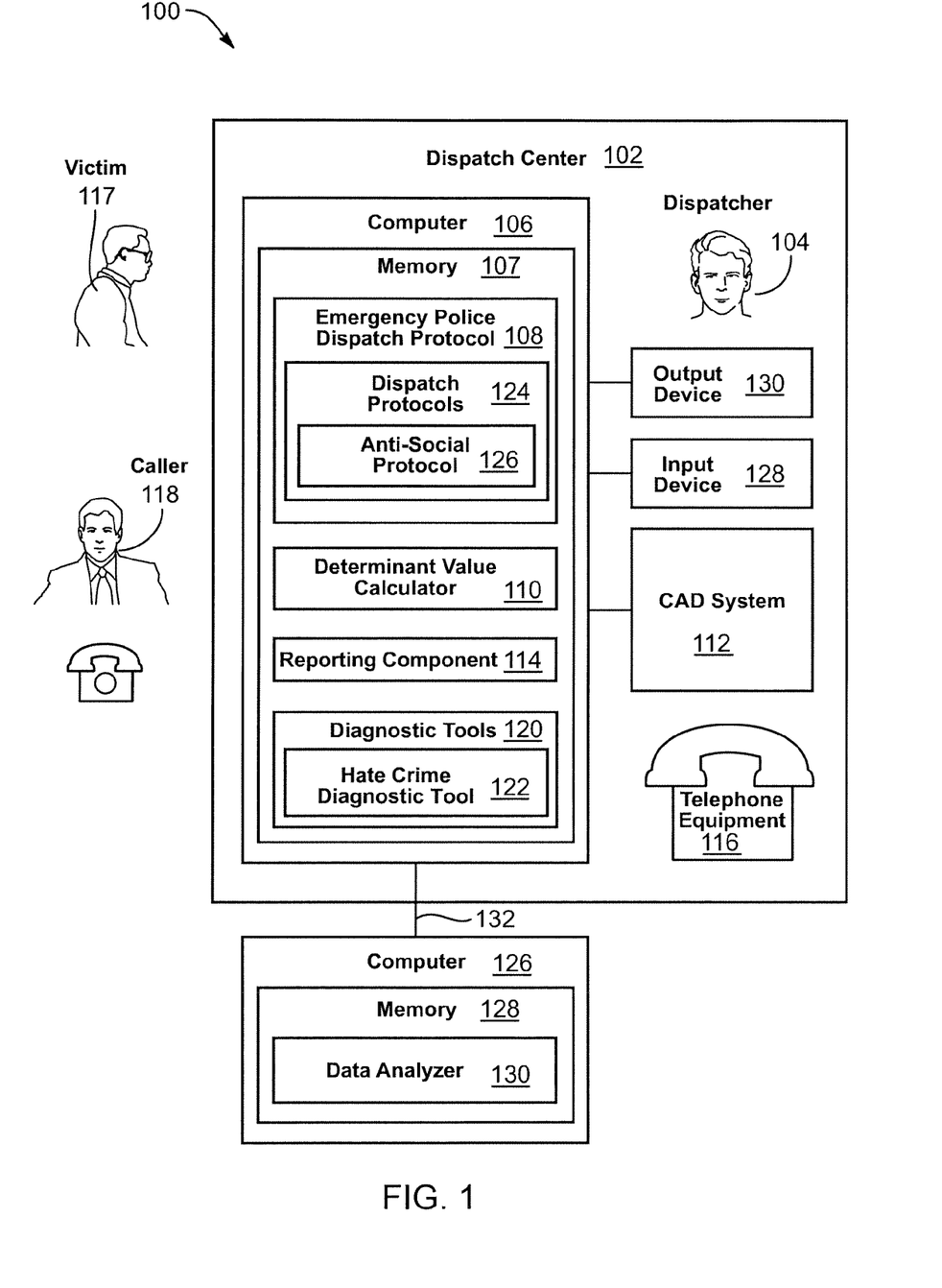
FIG. 1 is a block diagram of an emergency police dispatch system, according to one embodiment.

FIG. 1 is an emergency police dispatch system 100, according to one embodiment. At a dispatch center 102, a dispatcher 104 may operate a computer 106 or other computing device. The computer 106 may include a memory 107 to store protocols, modules, tools, data, etc. The computer 106 may be configured to follow an emergency police dispatch protocol 108 to enable the dispatcher 104 to rapidly and consistently address an emergency incident involving a crime, or otherwise requesting law enforcement, as reported by a caller 118. An emergency call requesting law enforcement may report an incident that may involve a victim 117. As can be appreciated, in some circumstances and/or incidents, the caller 118 is the victim 117. In other instances the caller may be a 2nd party, 3rd party, 4th party, or the suspect (or perpetrator). The emergency police dispatch protocol 108 may include a logic tree, preprogrammed inquiries or questions, possible responses from a caller 118 to the inquiries, and instructions to the caller 118. The responses may route to subsequent preprogrammed inquiries and/or instructions to the caller 118. The emergency police dispatch protocol 108 may also include dispatch protocols 124 for guiding the dispatcher 104 in processing emergency calls involving specific situations and/or incidents. The dispatch protocols 124 may similarly include a logic tree, preprogrammed inquiries or questions, possible responses from a caller 118 to the preprogrammed inquiries, and instructions for the caller 118. The dispatch protocols 124 may include an anti-social protocol 126 for rapid, consistent, and predictable processing of emergency calls involving hate crimes and other bias-motivated anti-social behavior.

The responses of the caller 118 are processed according to predetermined logic of the logic tree of the emergency police dispatch protocol 108. The predetermined logic may enable the emergency police dispatch system 100 to provide to the dispatcher 104 information concerning the correct emergency police dispatch response (e.g., by trained law enforcement officers or agencies and/or other emergency responders). The predetermined logic may also enable the emergency police dispatch system 100 to provide to the dispatcher 104 appropriate post-dispatch instructions for relay to the caller 118 before professional help arrives at the scene. The predetermined logic may also enable the emergency police dispatch system 100 to aid the dispatcher in determining an appropriate priority of the emergency call, including but not limited to a priority of the emergency call relative to other emergency calls and a level of emergency response to provide for the reported incident or situation.

Although an emergency police dispatch system 100 is disclosed and described herein, a person of ordinary skill can appreciate that other emergency dispatch systems and protocols are contemplated, including but not limited to emergency medical dispatch systems and protocols and emergency fire dispatch systems and protocols. Exemplary embodiments of emergency dispatch systems and protocols are disclosed in U.S. Pat. Nos. 5,857,966; 5,989,187; 6,004,266; 6,010,451; 6,053,864; 6,076,065; 6,078,894; 6,106,459; 6,607,481; 7,106,835; 7,428,301; and 7,436,937, which are hereby incorporated herein by reference.

The computer 106 operates a determinant value calculator 110 to calculate a determinant value from the responses of the caller 118 to protocol questions. The determinant value may be selected from a group of pre-established determinant values, such that the emergency responders are familiar with the determinant values and understand the meaning of each and what would be a corresponding emergency response. For example, the determinant values may range from E-1 for generally very serious emergencies to $\Omega$-2 for generally less serious emergencies. The determinant value may provide a categorization code of the type and level of the incident.

In one embodiment of the present disclosure, the determinant value is a combination of a determinant level (Alpha A, Bravo B, Charlie C, Delta D, Echo E and Omega $\Omega$) and a numeric value. Generally, $\Omega$-2 is the least serious while E-1 is the most serious call. Depending on the determinant level, the appropriate emergency response is dispatched as indicated by the response protocol. For example, an Alpha-A call will typically be responded to by a next available law enforcement unit using the safest arrival method reasonably possible. A Delta-D call will typically be responded to by any or all available law enforcement units proceeding under the most urgent method possible. Echo-E calls typically involve likely immediate life-threatening situations and will be responded to in the most urgent manner available. Bravo-B and Charlie-C calls are intermediate calls that are typically responded to in business-like, orderly manner according to specific department protocol. An Omega-$\Omega$ call is generally not specifically responded to, but rather is referred to another person or agency. For the purposes of this disclosure, Echo-E is generally abbreviated as E; Delta-D is generally abbreviated as D; Charlie-C is generally abbreviated as C; Bravo-B is generally abbreviated as B; Alpha-A is generally abbreviated as A; and Omega-$\Omega$ is generally abbreviated as a Generally, the lower determinant levels (e.g., numbers) within a determinant classification are more urgent than higher numbers. For example, an emergency dispatch call with a determinant value of D-1 is generally more critical requiring a more urgent response than a call with a determinant value of D-2. However, in some instances, the numeric determinant levels within a determinant value may serve only to identify the type, rather than criticality of the call. Also, if more than one determinant value can be assigned to a particular call, the more critical or higher determinant value is assigned. That is, the call is assigned a criticality determinant value based on the fact or aspect that would lead to the most urgent response. For example, if the call concerns a burglary that occurred over 30 minutes before, but where the suspect remains on the scene or nearby and the caller indicates that he or she is still in danger and feels his or her life is in imminent danger, then the determinant value assigned would be E-1 (due to the imminent danger) rather than D-2 (suspect on scene or nearby) or B-1 (incident occurred over 30 minutes before).

Many calls for law enforcement are not true emergencies, so it is important to prioritize the calls in several ways. First, calls that are true emergencies should be dispatched first. Second, if an agency has units with different capabilities, the emergencies involving more severe problems can be sent units that are more skilled and advanced (e.g., a S.W.A.T. team or bomb squad). And finally, if lights-and-siren are not needed, they should not be used, thereby increasing the safety of all those on the road and in the emergency response vehicles. The computer 106 presents the determinant value to generate an appropriate emergency dispatch response and/or establish the priority of the emergency call. The response may include dispatching professional law enforcement officers or other emergency responders to the scene of the emergency. The protocols used shall have passed through a rigorous review by a panel of experienced law enforcement agents and EMS public safety experts.

The determinant value may be provided to a Computer Aided Dispatch (CAD) system 112, which is a tool that a dispatcher 104 may use to track and allocate emergency response resources for processing emergency calls. The CAD system 112 may manage dispatcher tools for processing emergency calls, including but not limited to the emergency police dispatch protocol 108, communication resources (e.g., radio system, alpha pager), mapping tools (e.g., global positioning system (GPS) technology), and vehicle location systems (e.g., automatic vehicle location (AVL)). The CAD system 112 may operate in whole or in part on a separate computer in communication with the computer 106. In another embodiment, the CAD system 112 operates on the computer 106. The primary information used by the CAD system 112 is location information of both the incident and units, unit availability, and the type of incident. The CAD system 112 may use third party solutions, such as E-911, vehicle location transponders and mobile data terminals (MDT's) for automating the location and availability tasks. The CAD system may also use an emergency police dispatch protocol 108 to facilitate structured call taking for incident interrogation, as previously described.

Although many emergency calls are not true emergencies, all situations can benefit from expert evaluation and pertinent instruction. Prior to the arrival of professional help on-scene, the emergency police dispatch protocol 108 may provide the dispatcher 104 with instructions for the caller 118 that are appropriate to the type of call, whether the call relates to a complaint of vandalism to a call reporting a homicide. These instructions may help expedite the work of law enforcement officers and/or other emergency responders.

The computer 106 may also include a reporting component 114 to statistically measure the performance of individual staff and overall performance of the dispatch center 102. These statistics may include compliance rates, call processing statistics, and peer measurements.

The computer 106 may further comprise an input device 128, such as a keyboard, mouse, laser pointer, or other input device, and also an output device 130, such as a display monitor, printer, and/or speakers. The input device 128 receives input from a user (generally a dispatcher) and provides the input to the emergency police dispatch system 100. The input may be provided to the computer 106, the emergency protocol 108, the diagnostic tool 120, and/or the CAD system 112. An output device 130 receives output from the emergency police dispatch system 100 and displays or otherwise provides the output to the user. In another embodiment, the input device 128 and output device 130 are provided by the CAD system 112.

The dispatch center 102 includes a communication device 116 (e.g., telephone equipment) to answer emergency calls. A call into the dispatch center 102 from a caller 118 may initiate creation of an emergency call incident. The dispatcher 104 identifies the call as requiring an emergency police dispatch, and the emergency police dispatch protocol 108 is accessed. The protocol 108, including the dispatch protocols 124, may provide questions and/or instructions that are expertly drafted to assist a novice caller 118 in reporting aspects of the incident, and/or assessing a situation of a victim 117. The protocol 108 may also provide expertly drafted instructions to assist a victim 117 prior to the arrival of trained law enforcement and/or emergency responders. The instructions may be vocally relayed by the dispatcher 104 to the caller 118 over the communication device 116.

Some protocol inquiries or questions may be readily answerable by the caller 118, whereas others may be more difficult to answer. Certain diagnostic inquiries may be difficult for the untrained caller to determine or may be difficult to answer under the stress of an emergency situation. Accordingly, in addition to instructions, the emergency police dispatch system 100 may provide one or more computer-implemented diagnostic tools 120. The diagnostic tools 120 may greatly improve information collection and intervention for emergency medical response situations and aid in saving lives.

A diagnostic tool 120 may aid the dispatcher 104 and/or the caller 118 (via instructions from the dispatcher 104) in assessing a situation of a victim 117. A diagnostic tool 120 may also be an interventional tool, providing instructions that direct a caller 118 to intervene, or take action, to aid a victim 117, or otherwise change the circumstances or conditions of an emergency situation. For sake of clarity, diagnostic tools and interventional tools are both referred to herein generally as diagnostic tools. Accordingly, a diagnostic tool 120, as referred to herein, may provide diagnostic instructions, interventional instructions, or both diagnostic and interventional instructions. Whether a diagnostic tool 120 provides merely diagnostic instructions, merely interventional instructions, or both diagnostic and interventional instructions, the diagnostic tool provides consistent and reliable instruction, information gathering, and/or timing for a particular emergency situation.

The diagnostic tools 120 are computer implemented software modules that enable a dispatcher 104 to provide consistent, expert advice to assist a caller with regards to a particular aspect of an emergency situation, such as determining a vital sign. One benefit of the diagnostic tools 120 is the computer-aided timing of techniques to determine the vital signs. In highly stressful conditions, the diagnostic tools 120 provide a necessary resource to reading critical signs. The diagnostic tools 120 may be stored in the memory of the computer 106 and initiated and executed as required. The diagnostic tools 120 may be embodied as computer-executable software applications and associated data.

The emergency police dispatch protocol 108, including the dispatch protocols 124, also may call on one or more diagnostic tools 120 to assist with an inquiry and may route to the appropriate diagnostic tool 120 when needed. When directed according to the protocol, the emergency police dispatch protocol 108 may automatically, i.e., without dispatcher intervention, initiate the appropriate diagnostic tool 120. This may occur when the emergency police dispatch protocol 108 arrives at a diagnosis or assessment step in the logic tree. The emergency police dispatch system 100 may also allow the dispatcher 104 the option to call upon a diagnostic tool 120 as desired. Icons may be displayed in a tool bar or other convenient location on a user interface to allow the dispatcher 104 to initiate a corresponding diagnostic tool 120.

One particular diagnostic tool 120 discussed herein comprises a hate crime diagnostic tool 122. The hate crime diagnostic tool 122 may be configured as a surveillance tool to collect information in order to identify patterns, trends, and geographical clusters of hate crimes. The hate crime diagnostic tool 122 is configured to facilitate consistent, uniform collection of information, such that the information is gathered in substantially the same manner and seeking substantially the same set of information for all cases, regardless of the skill or experience of the dispatcher. The gathered information is uniform and quantifiable and can be appropriately measured or compared against other data gathered in a similar manner.

The hate crime diagnostic tool 122 may also be configured to advise emergency responder law enforcement officials that an emergency incident to which they are responding may involve a hate crime or other anti-social behavior. Advanced warning that the incident may involve bias motivations enables the emergency responders to take available precautions and to be more alert to potential factors and information that indicate a hate crime or anti-social behavior. The presence of a hate crime or other bias-motivated anti-social behavior may be communicated through addition of a suffix to the determinant value. Specific details about the hate crime, such as the bias category, may be passed to the emergency responders via a dispatcher communication with the responders, which may include a responder script.

Without a hate crime diagnostic tool 122, any information reported to dispatchers may go unconsidered and untracked. Even dispatchers who attempt to gather information indicative of hate crimes or other anti-social behavior are left to use varied and unsystematic approaches. There may be nearly as many ways to gather hate crime information as there are emergency dispatchers, dispatch services, law enforcement officers, and law enforcement agencies. For example, assuming two calls, a first dispatcher may ask three questions, whereas the second dispatcher may ask eight questions. When attempting to use the data gathered from the first and second calls, the data is nearly useless because the manner of gathering the information and the information sought varied. Thus, the data sets cannot be appropriately compared or measured against each other. By contrast, the hate crime diagnostic tool 122 aids to ensure that, no matter who gathers information concerning bias motivation of a hate crime, the gathering is consistently done the same way.

The information gathered by the hate crime diagnostic tool 122 can be used by law enforcement agencies to attempt to track hate crimes and trends occurring in a particular community or region. The information gathered by the hate crime diagnostic tool 122 can be stored for tracking purposes and also communicated to law enforcement agencies and other emergency response agencies to alert them of the potential for bias motivation in the incident to which they are responding, so that they can take any potential precautionary measures. The information can also be communicated to the emergency police dispatch protocol 108, including the dispatch protocols 124, for use in determining appropriate questions and/or instructions to provide to the dispatcher 104.

The hate crime diagnostic tool 122 may be launched from within, or at least in conjunction with, the progression of the emergency police dispatch protocol 108 and dispatch protocols 124, including the anti-social protocol 126, to enhance and supplement emergency call processing facilitated by the emergency police dispatch protocol 108. The hate crime diagnostic tool 122 may be launched automatically by the emergency police dispatch protocol 108, or launched manually by a dispatcher 104.

The hate crime diagnostic tool 122 is discussed below in reference to figures of graphical user interfaces that exemplify certain embodiments. One of skill in the art will appreciate that such interfaces may be implemented and designed in various ways and still be within the scope of the invention.

The emergency police dispatch system 100 may further comprise a data analyzer 130. The data analyzer 130 may be stored on a memory 128 of a separate (or remote) computer 126. The separate computer 126 may be coupled to the dispatch center computer 106 via a network connection 132, such as via the Internet. The data analyzer 130 may process the data collected by the hate crime diagnostic tool 122 to identify trends and track the geographic location and patterns of hate crimes and other anti-social behavior. The data analyzer 130 may be configured to identify patterns and relationships within a plurality of data records that may be received by the data analyzer 130. The data analyzer 130 may receive data records from a plurality of emergency dispatch sources, including a plurality of diagnostic tools (e.g., hate crime diagnostic tools), dispatch protocols, and/or emergency dispatch systems located geographically proximate to one another and/or geographically dispersed.

The collected data may be transmitted to the data analyzer 130 by the dispatch center computer system 106 via the network connection. In another embodiment, the data analyzer 130 may be stored on the memory 107 of the computer 106. In still another embodiment, the data analyzer 130 may be included as part of the CAD system 112. In still another embodiment, the data analyzer module 130 is operated by a third party, separate and apart from the emergency police dispatch system 100. The third party may receive collected data from a plurality of sources and the data analyzer 126 may process data from a plurality of sources.

Figure 2:
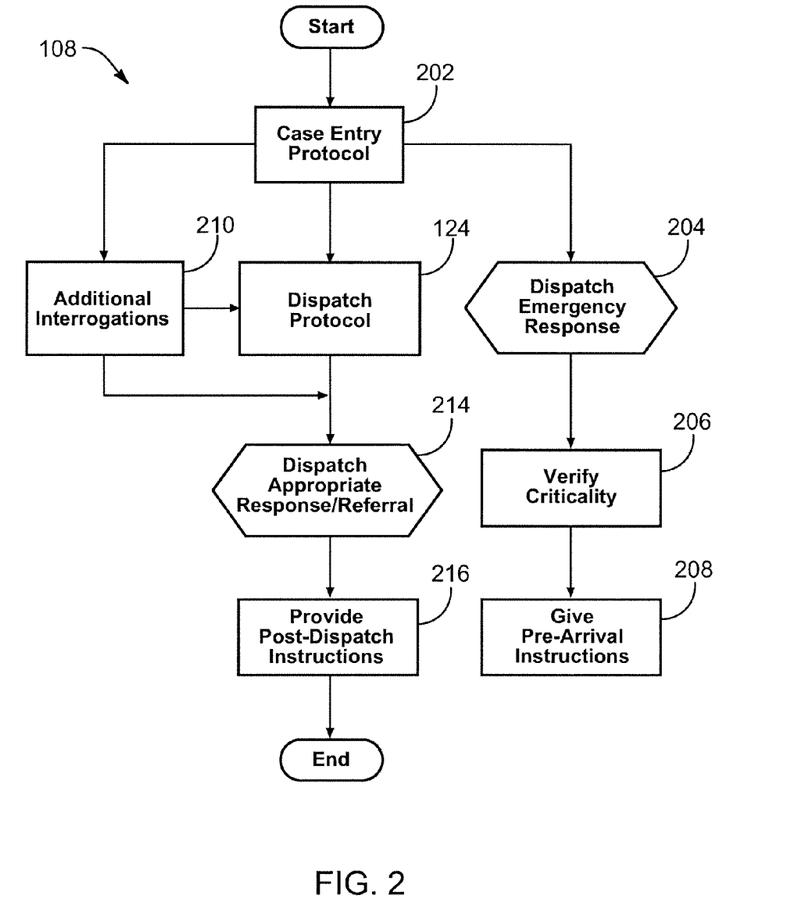
FIG. 2 is a flow diagram of an emergency police dispatch protocol of an emergency police dispatch system, according to one embodiment.

FIG. 2 is a high-level flow diagram of an emergency police dispatch protocol 108 of an emergency police dispatch system, according to one embodiment. The protocol 108 may begin with a case entry protocol 202 that guides the dispatcher in gathering initial information. One aim of the case entry protocol 202 is to obtain sufficient information from the caller to permit identification of a chief complaint. Also, the case entry protocol 108 may be considered a primary interrogation because all calls may be processed through the case entry protocol 202 to gather initial incident information. The information received through the case entry protocol 202 may include a location of the incident, a call-back number in the event the call is disconnected, the caller's name, and a description of the incident.

If the dispatcher receives and enters information that an incident is especially critical (e.g., a caller in imminent danger, a sinking vehicle, a vehicle in rising flood water, and a stuck accelerator and cannot stop vehicle), for whatever reason, an emergency response is dispatched 204 immediately, before continuing with any further interrogation or instructions. The dispatched emergency response 204 may be a maximum emergency response, including properly trained law enforcement officers. The criticality of the incident 206 is verified and pre-arrival instructions are given 208. The pre-arrival instructions can be tailored to the specific incident and/or situation. Typically, a result of properly conveyed (by the dispatcher) and executed (by the caller) instructions may be a more calm, stable situation at the time the law enforcement emergency responders arrive. The pre-arrival instructions may aid to ensure safety and improve the effectiveness of the dispatched 204 emergency response.

If the dispatcher receives information from the caller to confirm the incident is not critical (e.g., not an imminent danger), but the dispatcher lacks sufficient information to proceed directly to a dispatch protocol 124, the emergency police dispatch protocol 108 may shunt to additional inquiries 210 designed to guide the dispatcher to gather information from the caller to enable the dispatcher to ascertain the chief complaint. If the chief complaint is determined, the emergency police dispatch protocol 108 may shunt to the appropriate dispatch protocol 124 for dealing with that chief complaint.

The dispatch protocol 124 may guide the dispatcher through a secondary interrogation focusing on the chief complaint. The dispatch protocol 124 may present a pre-scripted interrogation to enable a more orderly and detailed understanding of the incident that can be communicated to law enforcement emergency responders. The pre-scripted interrogation may include preprogrammed inquiries focused on gathering information relating to the chief complaint. The preprogrammed inquiries provided by the dispatch protocol 124 may be termed "Key Questions" for the particular situation or condition of the chief complaint. The preprogrammed inquiries presented may depend on caller responses.

During the dispatch protocol 124, the dispatcher and/or the emergency police dispatch protocol 108 will gather information about the circumstances of the incident or emergency situation, discovered through interrogation, and may dispatch 214 an appropriate emergency dispatch response. The dispatch protocol 124 facilitates uniform and consistent gathering of information relating to the emergency and dispatching of an appropriate emergency dispatch response. The appropriate emergency dispatch response may be determined through a system of assigning determinant values as the protocol progresses (i.e., traverses) through a logic tree. The determinant values, as described above, may range, for example, from E-1 for generally very serious emergencies to Ω-2 for generally less serious emergencies.

After the appropriate emergency dispatch response has been sent (e.g., law enforcement officers), the dispatcher may remain on the telephone with the caller to provide post-dispatch instructions 216 regarding what to do, and what not to do, prior to the arrival of law enforcement officers. The post-dispatch instructions 216 help to stabilize the situation, and to expedite the work of law enforcement officers at the scene. Post-dispatch instructions may include, for example, "do not disturb anything at the scene, including weapons, tools, or objects found nearby," "stay on the line and I'll tell you exactly what to do next," and the like.

Figure 3:
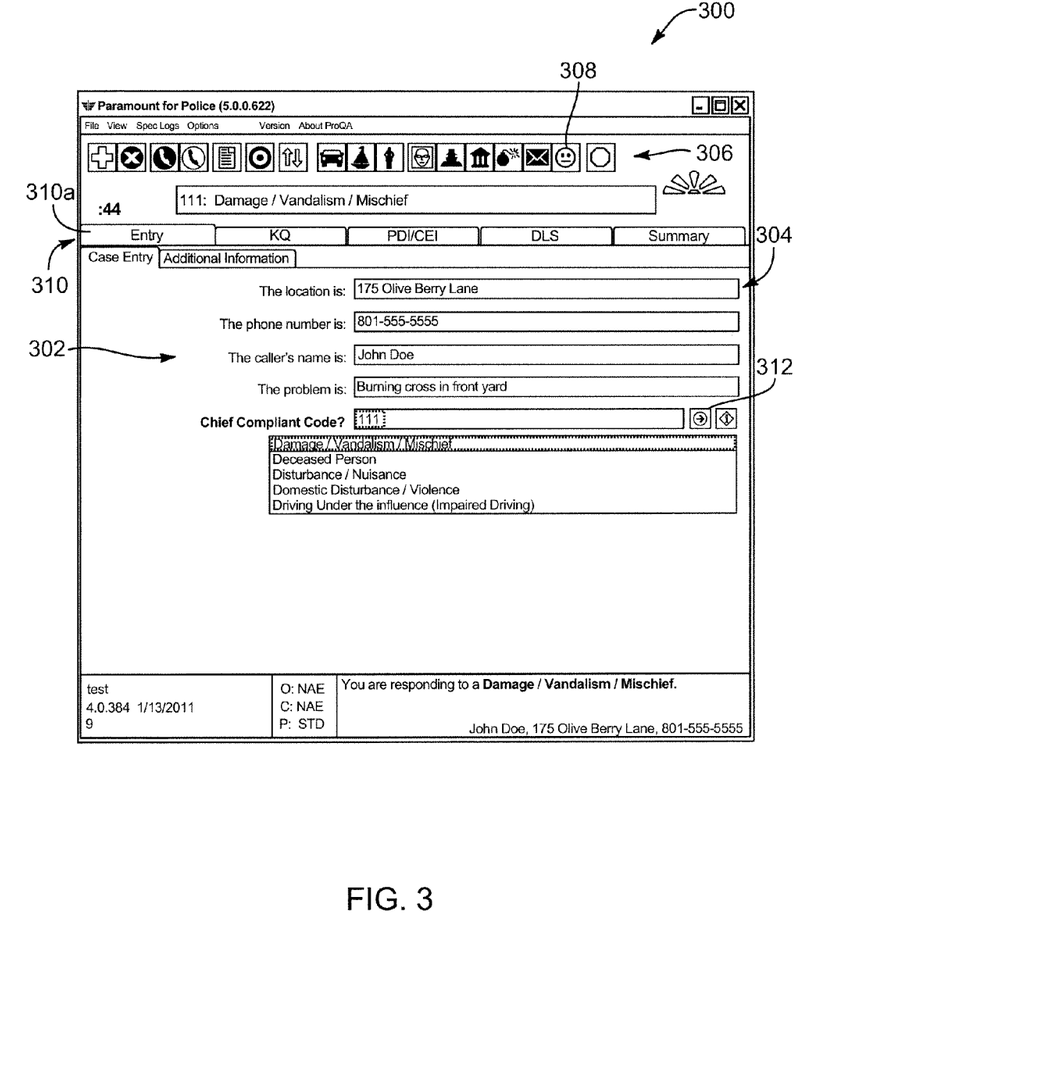
FIG. 3 is a user interface of an emergency police dispatch system, according to one embodiment.

FIG. 3 is a user interface 300 of an emergency police dispatch system, according to one embodiment. The emergency police dispatch system user interface 300 allows a dispatcher to interface with the emergency police dispatch protocol. The illustrated user interface 300 is shown traversing a case entry protocol 202 of the emergency police dispatch protocol 108 (described above with reference to FIG. 2). The emergency police dispatch protocol may present inquiries 302 (or questions) via the emergency police dispatch system user interface 300. The inquiries 302 are provided for the dispatcher to relay to the caller to gather information regarding the reported incident or emergency. The dispatcher and/or the emergency police dispatch system may gather the information in the form of caller responses to the inquiries 302. The dispatcher may input the responses of the caller to the inquiries into response fields 304 provided by the user interface 300. The response fields 304 may include, for example, any of a number of appropriate input field types, including but not limited to text fields, text boxes, menus, drop down menus, drop-down selection boxes, lists, buttons, check boxes, and radio buttons. The response fields 304 may correspond to information indicative of one or more responses of the caller to the inquiries 302.

The caller responses are relayed from the caller to the dispatcher, typically over the telephone. Information from the caller responses may be input into the system by the dispatcher and may be used by the emergency police dispatch protocol to determine subsequent inquiries 302 and instructions to present to the dispatcher. The caller response information may indicate the caller's observations of the incident and/or current situation. The emergency police dispatch system may use the caller response information to generate an emergency police dispatch response by properly trained law enforcement officers. The information gathered from the caller responses may be used by the determinant value calculator to calculate a determinant value that can be communicated to the emergency responders. Additional details relating to emergency police dispatch protocols and user interfaces to interact with the same can be found in the earlier referenced U.S. patents.

The user interface 300 may further comprise tabs 310 to aid in organizing and/or compartmentalizing various aspects of processing a call. The tabs 310 may include a tab 310a for presenting a case entry protocol portion of an emergency police dispatch protocol (e.g., "Entry" tab). Other tabs may include a tab for presenting a dispatch protocol portion of the emergency police dispatch protocol (e.g., a "KQ" tab or Key Questions tab), a tab for presenting post-dispatch instructions and/or critical EMD information (e.g., a "PDI/CEI" tab), a tab for dispatching life support (e.g., a "DLS" tab), and a tab summarizing the call and/or processing of the call (e.g., "Summary" tab).

The user interface 300 may provide an input component 312 for the dispatcher to indicate when the portion of the emergency police dispatch protocol presented by the tab 310 has been completed. The input component 312 may be a navigation button, as illustrated in FIG. 3, to enable a dispatcher to provide input that indicates to the user interface 300 that the dispatcher is ready to proceed to a next phase of the emergency police dispatch protocol.

The emergency police dispatch system user interface 300 may also provide one or more diagnostic tool launch inputs 306. As illustrated, one or more buttons may be provided on the user interface as diagnostic tool launch inputs 306. As will be appreciated by a person of ordinary skill, the diagnostic tool launch inputs 306 may comprise a component other than a button, including familiar user interface components such as a drop down menu, a drop down selection box, a list, a check box, and a radio button. The diagnostic tool launch inputs 306 enable the dispatcher to launch a particular diagnostic tool. Although the emergency police dispatch protocol may automatically initiate a diagnostic tool based on dispatcher-entered input indicative of one or more responses of the caller, the diagnostic tool launch inputs 306 provide a way for the dispatcher to manually (i.e., anytime, at the dispatcher's discretion) initiate a diagnostic tool. In FIG. 3, a hate crime diagnostic tool launch input 308 is provided. The hate crime diagnostic tool launch input 308 comprises a button on the emergency police dispatch system user interface 300. The button may include, for example, an icon or a symbol, such as a green circle with eyes and a mouth as shown, to indicate that the button is the hate crime diagnostic tool launch input 308, which manually initiates a hate crime diagnostic tool.

Figure 4:
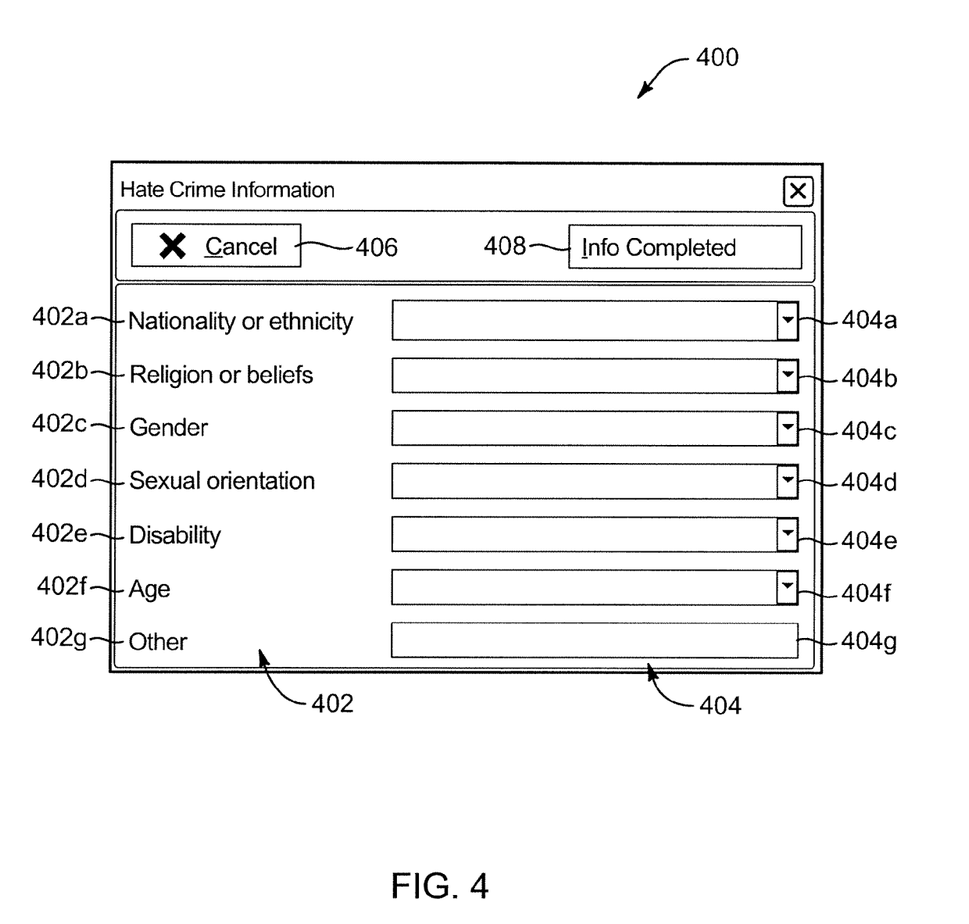
FIG. 4 is a user interface of a hate crime diagnostic tool, according to one embodiment.

FIG. 4 is a user interface 400 of a hate crime diagnostic tool, according to one embodiment. The illustrated embodiment of the hate crime diagnostic tool may present on the user interface 400 a listing of a plurality of bias categories 402, a plurality of input fields 404, a "cancel" input component 406, and an "info completed" input component 408. These components of the user interface 400 may be presented to the user in a manner that prompts the dispatcher of bias categories (or potential categories of bias) that should be considered when processing a call reporting an incident that may involve a hate crime or other bias-motivated anti-social behavior. The user interface 400 aids a dispatcher in collecting information that can be used to identify potential biases of the perpetrator, as well as enable compiling of statistics and identification of patterns, trends, and potentially geographical clusters of hate crimes and other bias-motivated anti-social behavior.

The listing of a plurality of bias categories 402 provides prompts for the dispatcher to guide uniform collection of victim information. Specifically, the listing of bias categories 402 guides the dispatcher to consider a pre-defined set of potential bias categories for calls in which a hate crime or other bias-motivated anti-social behavior is suspected. The dispatcher can relay to the caller over the telephone any or all pertinent bias categories. In the illustrated embodiment, the plurality of bias categories 402 include "Nationality or ethnicity" 402a, "Religion or beliefs" 402b, "Gender" 402c, "Sexual orientation" 402d, "Disability" 402e, and "Age" 402f. A catch-all category, "Other" 402g, is also provided for instances when the caller may report a potential bias motivation of the perpetrator that does not fall into one of the other listed bias categories 402.

The input fields 404 that are presented on the user interface 400 provide the dispatcher a way to easily provide input to the hate crime diagnostic tool. The input provided can be victim information relating to potential biases that could have motivated the perpetrator. The input field 404 can be associated with respective corresponding bias categories 402. For example, input provided by the dispatcher via a nationality or ethnicity input field 404a will be associated with the "Nationality or ethnicity" bias category 402a. Because the data captured from the input information is associated with a bias category 402, a data record can be created that is consistent with other data records, which creates a usable and useful data set from which trends of bias-motivated anti-social behavior can be tracked. Moreover, the input fields 404 facilitate uniform, predictable, and consistent collection of victim information. In the illustrated embodiment, the input fields 404 are comboboxes (or editable dropdown list boxes), in which one of the options is editable, like a textbox, and the rest of the options are pre-defined. A dispatcher can freely enter text input, or select one of the pre-defined options. The dropdown list options may be configurable via another user interface accessible by an administrator.

As can be appreciated, the input fields 404 may be, for example, any of a number of appropriate input field types, including but not limited to text fields, text boxes, menus, drop down menus, drop-down selection boxes, lists, buttons, check boxes, and radio buttons.

As can also be appreciated, the dispatcher need not provide input for all of the input fields 404. The dispatcher can provide input to the input fields 404 for any or all applicable corresponding bias categories 402. For example, if the caller does not have any disability, no input need be provided to the disability input field 404e. There is likely no potential bias in the disability bias category 402e. Although not all of the input fields 404 may be provided information by the dispatcher, a data record can be created with any information that is provided. The data record can be uniform and consistent with other data records because the set of bias categories considered, and set of information that can possibly be received, is predetermined and known.

The cancel input component 406 in the illustrated embodiment is a button. The dispatcher can click the cancel input component 406 to cancel, or close, the user interface 400 of the hate crime diagnostic tool, and terminate the tool and/or transfer control back to the dispatch protocol and/or the emergency dispatch protocol of the emergency dispatch system. The cancel input component 406 may be useful for situations where the dispatcher may have suspected a hate crime or other anti-social behavior, and thus launched the hate crime diagnostic tool, but learned upon further questioning that, for example, the caller or victim does not think the perpetrator of the incident had any bias motivation or the victim otherwise does not have any characteristics worthy of recording in the hate-crime diagnostic tool as potential biases of the perpetrator. As can be appreciated, the cancel input component 406 may be, for example, any of a number of appropriate input field types.

The info completed input component 408 enables the dispatcher to indicate to the hate crime diagnostic tool when all available victim information has been provided via the input fields 404, and to trigger processing of the victim information input provided to the input fields 404. The info completed input component 408 of the illustrated embodiment is a button. When the info completed input component 408 is clicked, the diagnostic tool may compile the victim information received via the plurality of input fields 404 and communicate the victim information to the dispatch protocol. The dispatch protocol may compile the received victim information with incident information into a data record. The data record may be stored, or communicated to another computer for storage, for later retrieval and analysis in connection with a subsequent incident involving bias-motivated anti-social behavior toward the victim.

As can be appreciated, in another embodiment the diagnostic tool may compile the victim information into a data record, separate from incident information collected by a dispatch protocol and/or separate from a data record created by the dispatch protocol. As can also be appreciated, the info completed input component 408 may be, for example, any of a number of appropriate input field types, including but not limited to a drop down menu, a drop-down selection box, a button, a check box, and a radio button.

Figure 5:
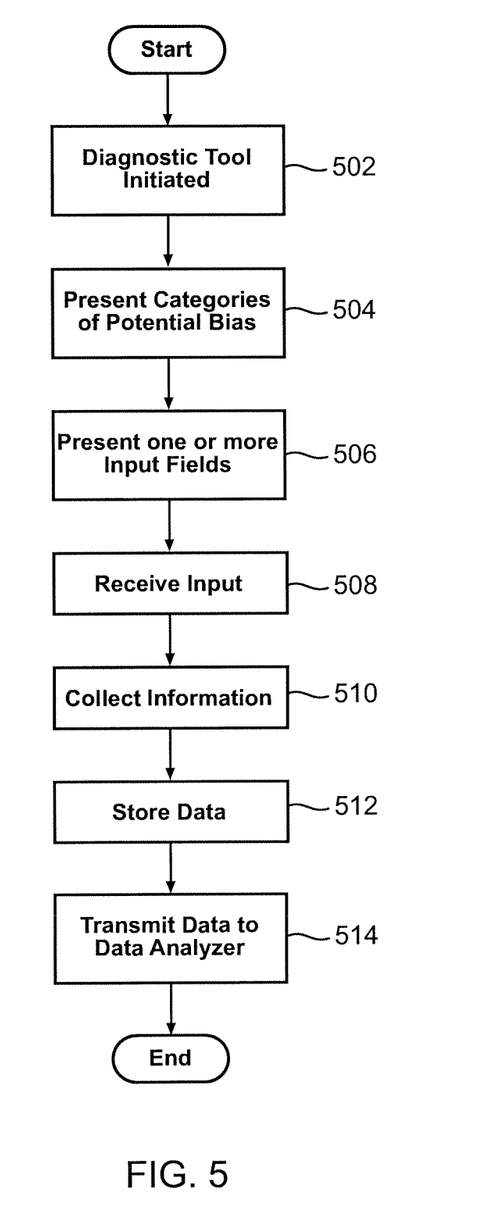
FIG. 5 is a flow diagram of a method implemented by a hate crime diagnostic tool to assist a dispatcher when communicating with a caller regarding an incident potentially involving a hate crime, according to one embodiment.

FIG. 5 is a flow diagram of a method implemented by a hate crime diagnostic tool to assist a dispatcher when communicating with a caller regarding an incident potentially involving a hate crime, according to one embodiment. The diagnostic tool is typically, but not always, initiated 502 from a dispatch protocol, either automatically in response to a question or manually in response to manipulation (e.g., a mouse click) of the hate crime diagnostic tool launch input 308 (shown in FIG. 3). Initiating the hate crime diagnostic tool may include the diagnostic tool presenting a user interface configured to aid the dispatcher in uniformly collecting victim information relating to potential biases that could have motivated the perpetrator. The user interface may present 504 a plurality of bias categories (or categories of potential bias) and present 506 one or more input fields, as was described above with reference to FIG. 4. The input fields presented 506 may correspond to and/or be associated with the plurality of bias categories. The input fields presented 506 may accept input from the dispatcher providing victim information for the corresponding bias categories.

The diagnostic tool receives 508 input that is provided to the input fields. For example, a dispatcher may enter input into one or more of the input fields of the user interface to provide victim information to diagnostic tool. The diagnostic tool may also collect 510 the received victim information. For example, an input completed input component on the user interface may be clicked to trigger to diagnostic tool to collect 510 the victim information received in each of the input fields of the user interface. Collection 510 of the victim information may include creating a data record. Collection 510 of the victim information may also include communicating the received data to a dispatch protocol and/or other component of an emergency dispatch system. Collection 510 of the victim information may also include compiling the collected victim information with incident information collected by the dispatch protocol.

The victim information may be stored 512, for example, as a data record for later retrieval and analysis in connection with a subsequent incident involving bias-motivated anti-social behavior toward the victim. Storing 512 the data may also allow the victim information to be data mined and/or analyzed to, for example, identify trends in bias-motivated anti-social behavior. In the illustrated embodiment, the stored data may be transmitted 514 to a data analyzer that is configured to identify patterns and relationships among multiple data records received by the data analyzer. The data analyzer may receive data records from a plurality of hate crime diagnostic tools, dispatch protocols, and/or emergency dispatch systems, from varying dispatch centers and/or geographic regions. The data records are uniformly compiled, allowing data from a plurality of emergency dispatch sources to be analyzed, mined, compared, and the like, to draw conclusions about the health of pluralism, minority/majority relations, tolerance, and the like in varying ranges of geographic regions. For example, in the United Kingdom, there is currently a push for a national standard for police services and greater sharing of data between different counties and regions.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A computer-implemented method to assist a dispatcher, when communicating vocally with a caller via a communication device regarding an incident involving bias-motivated anti-social behavior toward a victim, to collect information about the victim to identify a potential bias that could have motivated the perpetrator toward the victim, the method comprising:

provideing on a dispatch center computer system an emergency dispatch protocol to assist the dispatcher when communicating with the caller, the protocol presenting a pre-scripted interrogation including a plurality of pre-programmed inquiries for the dispatcher to ask the caller to collect information regarding the incident and generate an emergency dispatch response by emergency responders based on the collected information;

initiating a diagnostic tool on the dispatch center computer system, the diagnostic tool configured to aid the dispatcher in uniformly collecting victim information relating to potential biases that could have motivated the perpetrator, the diagnostic tool presenting to the dispatcher a user interface, presenting on the user interface a listing of a plurality of bias categories for the dispatcher to vocally relay to the caller over the communication device, presenting on the user interface a plurality of input fields corresponding to the plurality of bias categories, each input field configured to accept input providing victim information for a corresponding bias category, receiving dispatcher-entered input that is indicative of victim information and associating the victim information to the corresponding bias category, and communicating the victim information corresponding to one or more of the plurality of bias categories to the dispatch protocol; and compiling on the dispatch center computer system the victim information and incident information into a data record for later retrieval and analysis in connection with a subsequent incident involving bias-motivated anti-social behavior toward the victim.

2. A computer-implemented method of claim 1, wherein the data record compiled with the victim information and incident information has a uniform format that can be processed to monitor trends in bias-motivated anti-social behavior.

3. A computer-implemented method of claim 1, further comprising transmitting the data record from the dispatch center computer system to a data analyzer that is configured to identify patterns and relationships within data records received by the data analyzer.

4. A computer-implemented method of claim 1, wherein the plurality of bias categories include a category for nationality or ethnicity.

5. A computer-implemented method of claim 1, wherein the plurality of bias categories include a category for religion or beliefs.

6. A computer-implemented method of claim 1, wherein the plurality of bias categories include a category for gender.

7. A computer-implemented method of claim 1, wherein the plurality of bias categories include a category for sexual orientation.

8. A computer-implemented method of claim 1, wherein the plurality of bias categories include a category for disability.

9. A computer-implemented method of claim 1, wherein the plurality of bias categories include a category for age.

10. A computer-implemented method of claim 1, wherein the data record compiled with the victim information and incident information comprises geographic information that identifies a location of the incident and that can be used to identify patterns, trends, and geographical clusters of bias-motivated anti-social behavior.

11. A computer system for assisting a dispatcher, when communicating vocally with a caller via a communication device regarding an incident involving bias-motivated anti-social behavior toward a victim, to collect information about the victim to identify potential biases that could have motivated the perpetrator toward the victim, the system comprising:

a processor;

an input device in electrical communication with the processor;

an output device in electrical communication with the processor; and a memory in electrical communication with the processor, and having stored thereon:

an emergency dispatch protocol to assist the dispatcher when communicating with the caller, the protocol presenting a plurality of interrogatories on the output device for the dispatcher to ask the caller to collect information regarding the incident and generate an emergency dispatch response by emergency responders based on the collected information;

a diagnostic tool to aid the dispatcher in uniformly collecting information about the victim relating to potential biases that could have motivated the perpetrator, the diagnostic tool configured to present to the dispatcher a user interface on the output device, the user interface including a listing of a plurality of bias categories for the dispatcher to vocally relay to the caller over the communication device and a plurality of input fields corresponding to the plurality of bias categories, each input field configured to accept input providing information about the victim for the corresponding bias category, receive dispatcher-entered input provided via the input device to the input fields, the input indicative of information about the victim and associate to one or more corresponding bias categories, and communicate the victim information corresponding to one or more of the plurality of bias categories to the emergency dispatch protocol, wherein the computer system compiles the victim information and incident information into a data record that is stored for later retrieval and analysis in connection with a subsequent incident involving bias-motivated anti-social behavior toward the victim.

12. A computer system of claim 11, wherein the data record compiled to include victim information and incident information has a uniform format that can be processed to monitor trends in bias-motivated anti-social behavior.

13. A computer system of claim 11, further comprising a data analyzer that is configured to identify patterns and relationships within data records received by the data analyzer, wherein the computer system transmits the data record to the data analyzer.

14. A computer system of claim 13, wherein the data analyzer is positioned on a remote computing device coupled to the computer system via network connection.

15. A computer-implemented method of claim 11, wherein the plurality of bias categories include a category for nationality or ethnicity.

16. A computer-implemented method of claim 11, wherein the plurality of bias categories include a category for religion or beliefs.

17. A computer-implemented method of claim 11, wherein the plurality of bias categories include a category for gender.

18. A computer-implemented method of claim 11, wherein the plurality of bias categories include a category for sexual orientation.

19. A computer-implemented method of claim 11, wherein the plurality of bias categories include a category for disability.

20. A computer-implemented method of claim 11, wherein the plurality of bias categories include a category for age.

21. A computer-implemented method of claim 11, wherein the data record compiled with the victim information and incident information comprises geographic information that identifies a location of the incident and that can be used to identify patterns, trends, and geographical clusters of bias-motivated anti-social behavior.

22. A non-transitory computer-readable storage medium including computer-readable instruction code for a dispatch center computer performing a method to assist a dispatcher, when communicating with a caller via a communication device regarding an incident involving bias-motivated anti-social behavior toward a victim, to collect information about the victim to identify potential biases that could have motivated the perpetrator toward the victim, the method comprising: providing on a dispatch center computer system an emergency dispatch protocol to assist the dispatcher when communicating with the caller, the protocol presenting a plurality of interrogatories for the dispatcher to ask the caller to collect information regarding the incident and generate an emergency dispatch response by emergency responders based on the collected information; initiating a diagnostic tool on the dispatch center computer system, the diagnostic tool configured to aid the dispatcher in uniformly collecting information about the victim that pertains to one or more bias categories, wherein the victim information specifies characteristics about the victim that can be a basis for a particular bias in one of the bias categories that could have motivated the perpetrator, the diagnostic tool presenting to the dispatcher a user interface, presenting on the user interface a listing of a plurality of bias categories for the dispatcher to vocally relay to the caller over the communication device, presenting on the user interface a plurality of input fields corresponding to the plurality of bias categories, each input field configured to accept input providing information about the victim for the corresponding bias category, receiving dispatcher-entered input that is indicative of information about the victim and associating the information to the corresponding bias category, and communicating the victim information corresponding to one or more of the plurality of bias categories to the dispatch protocol; and compiling on the dispatch center computer system the victim information and incident information into a data record for later retrieval and analysis in connection with a subsequent incident involving bias-motivated anti-social behavior toward the victim.

* * * * *